United States Patent
Smolic et al.

(10) Patent No.: US 9,565,414 B2
(45) Date of Patent: Feb. 7, 2017

(54) EFFICIENT STEREO TO MULTIVIEW RENDERING USING INTERLEAVED RENDERING

(71) Applicant: Disney Enterprises, Inc., Burbank, CA (US)

(72) Inventors: Aljosa Aleksej Andrej Smolic, Aargau (CH); Pierre Greisen, Zurich (CH); Simon Heinzle, Zurich (CH); Michael Schaffner, Zurich (CH); Frank Kağan Gürkaynak, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 506 days.

(21) Appl. No.: 14/133,518

(22) Filed: Dec. 18, 2013

(65) Prior Publication Data

US 2014/0347452 A1 Nov. 27, 2014

Related U.S. Application Data

(60) Provisional application No. 61/827,493, filed on May 24, 2013.

(51) Int. Cl.
*H04N 13/04* (2006.01)
*H04N 13/00* (2006.01)

(52) U.S. Cl.
CPC ...... *H04N 13/0011* (2013.01); *H04N 13/0029* (2013.01)

(58) Field of Classification Search
CPC ............ H40N 13/0404; H40N 13/0409; G02B 27/2214
USPC ...................................................... 348/54, 59
See application file for complete search history.

(56) References Cited

U.S. PATENT DOCUMENTS

| | | | |
|---|---|---|---|
| 2011/0026809 A1* | 2/2011 | Jeong | G06T 7/0022 382/154 |
| 2013/0057644 A1* | 3/2013 | Stefanoski | G06T 5/50 348/42 |
| 2013/0106998 A1* | 5/2013 | Pahalawatta | H04N 13/0029 348/43 |

* cited by examiner

*Primary Examiner* — Michael Lee
(74) *Attorney, Agent, or Firm* — Patterson & Sheridan, LLP

(57) ABSTRACT

Approaches are described for generating a multiview autostereoscopic image from a stereo three-dimensional input image pair. A stereo to multiview rendering system receives a stereo three-dimensional image including a left image and a right image at a first view position and a second view position, respectively. The system generates a first input warp and a second input warp that maps the left image and the right image to a third and fourth positions, respectively, where the third and fourth positions lie between the first and second view positions. The system generates a plurality of output warps based on the first warp and the second warp. The system resamples each output warp in the plurality of output warps to create a plurality of partial output images. The system interleaves the plurality of partial output images to generate a composite output image.

20 Claims, 13 Drawing Sheets

EFFICIENT STEREO TO MULTIVIEW RENDERING USING INTERLEAVED RENDERING

CROSS-REFERENCE TO RELATED APPLICATIONS

This application claims the benefit of United States provisional patent application entitled "EFFICIENT STEREO TO MULTIVIEW RENDERING USING INTERLEAVED RENDERING," Ser. No. 61/827,493, filed May 24, 2013, which is hereby incorporated herein by reference.

BACKGROUND

Field

The present application relates to the field of computer animation and, in particular, to efficient stereo to multiview rendering using interleaved rendering.

Description of the Related Art

High-quality multiview displays are being introduced to the consumer market. Multiview displays are associated with autostereoscopy, which involves methods of displaying stereoscopic images without requiring the viewer to wear special glasses to achieve a three-dimensional (3D) effect. Such multiview displays are expected to become widely available in the coming years. Typically, multiview displays present multiple input views taken from different perspectives to the viewer, whereas 3D content from movie production presently provides two-view stereoscopic content— one for the left and one for the right eye. Various approaches for converting two-view stereoscopic content to multiview content provide good results but suffer from high demand for computational power, and correspondingly long rendering times. As a result, such approaches are currently not able to provide real-time stereoscopic to multiview conversion.

SUMMARY

One embodiment sets forth a method for generating a multiview autostereoscopic image. The method includes receiving a stereo three-dimensional image including a left image at a first view position and a right image at a second view position. The method further includes generating a first input warp that maps the left image to a third view position that lies between the first view position and the second view position; and generating a second input warp that maps the right image to a fourth view position that lies between the first view position and the second view position. The method further includes generating a plurality of output warps based on the first warp and the second warp. The method further includes resampling each output warp in the plurality of output warps to create a plurality of partial output images. The method further includes interleaving the plurality of partial output images to generate a composite output image.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing system configured to implement one or more aspects of the disclosed methods.

BRIEF DESCRIPTION OF THE DRAWINGS

So that the manner in which the above recited features of the application can be understood in detail, a more particular description of the application, briefly summarized above, may be had by reference to embodiments, some of which are illustrated in the appended drawings. It is to be noted, however, that the appended drawings illustrate only typical embodiments of this application and are therefore not to be considered limiting of its scope, for the application may admit to other equally effective embodiments.

DETAILED DESCRIPTION

Figure 1:
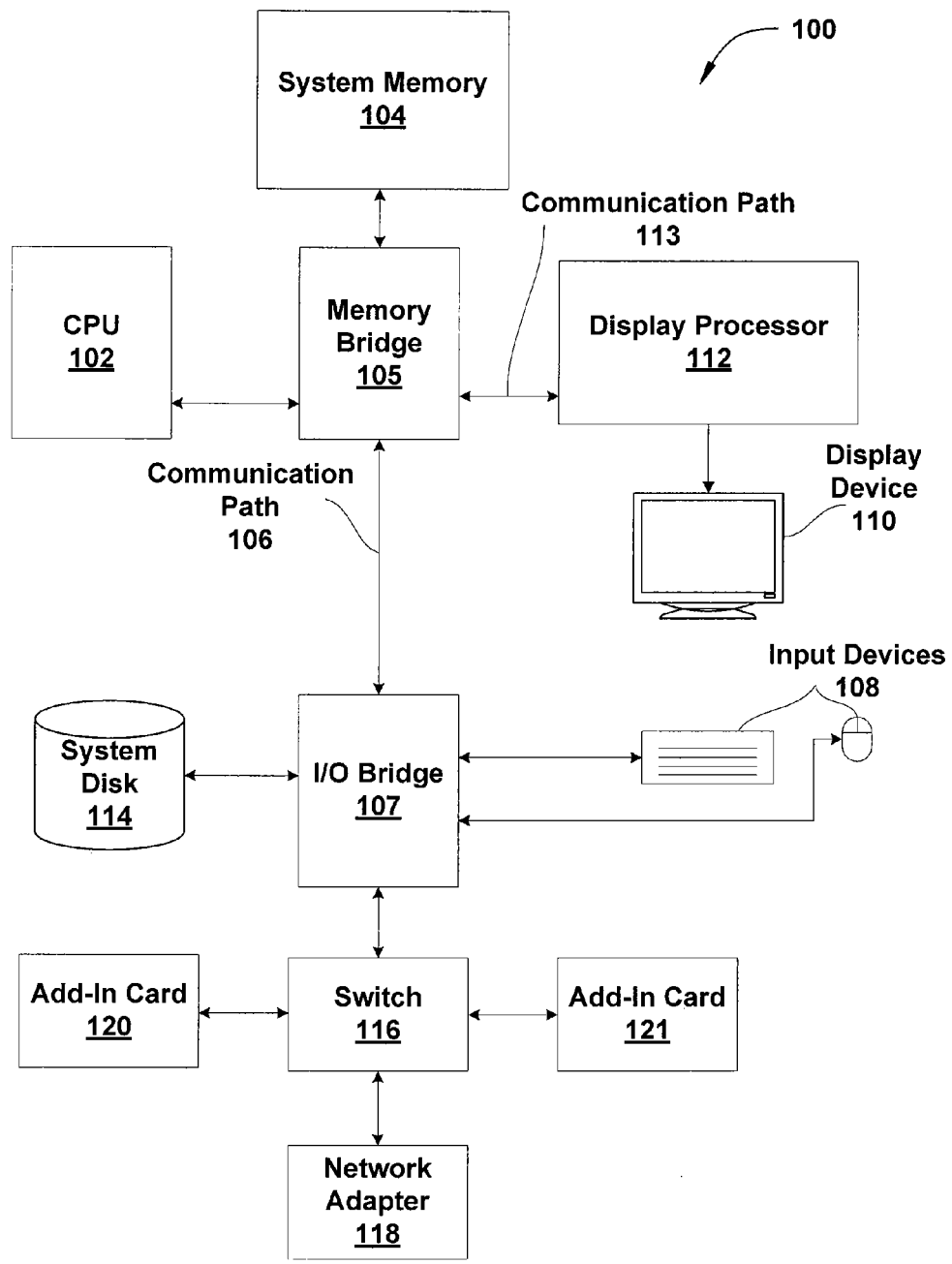
FIG. 1 depicts one architecture of a system within which embodiments of the present application may be implemented.

In the following, reference is made to some embodiments. However, it should be understood that the application is not limited to specific described embodiments. Instead, any combination of the following features and elements, whether related to different embodiments or not, is contemplated to implement and practice the application. Furthermore, although embodiments of the application may achieve advantages over other possible solutions and/or over the prior art, whether or not a particular advantage is achieved by a given embodiment is not limiting of the application. Thus, the following aspects, features, embodiments and advantages are merely illustrative and are not considered elements or limitations of the appended claims except where explicitly recited in a claim(s).

As will be appreciated by one skilled in the art, aspects of the present application may be embodied as a system, method or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Such computer, other programmable apparatus or other device may include, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC).

Hardware Overview

FIG. 1 depicts one architecture of a system 100 within which embodiments of the present application may be implemented. This figure in no way limits or is intended to limit the scope of the present application.

System 100 may be a personal computer, video game console, personal digital assistant, rendering engine, or any other device suitable for practicing one or more embodiments of the present application.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present application, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs or multiview autostereoscopic images processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images, or generating and interleaving multiple views, in the case of multiview autostereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Stereo to Multiview Rendering

A video rendering system is disclosed for generating multiview autostereoscopic displays using an image domain warping approach. In some embodiments, the video rendering system may synthesize up to nine interleaved views from full-HD (1080p) stereoscopic 3D input footage. The system may employ elliptical weighted average (EWA) splatting to perform image resampling. The system may use the mathematical properties of the Gaussian filters of EWA splatting to analytically integrate display anti-aliasing into the resampling function. Realistic assumptions on the image transformation process may enable a hardware architecture that operates on a video stream in scan-line fashion without the need for an off-chip memory. In one embodiment, such a hardware architecture may generate 28.7 interleaved full-HD (1080p) frames per second, where each frame includes eight views.

Figure 2:
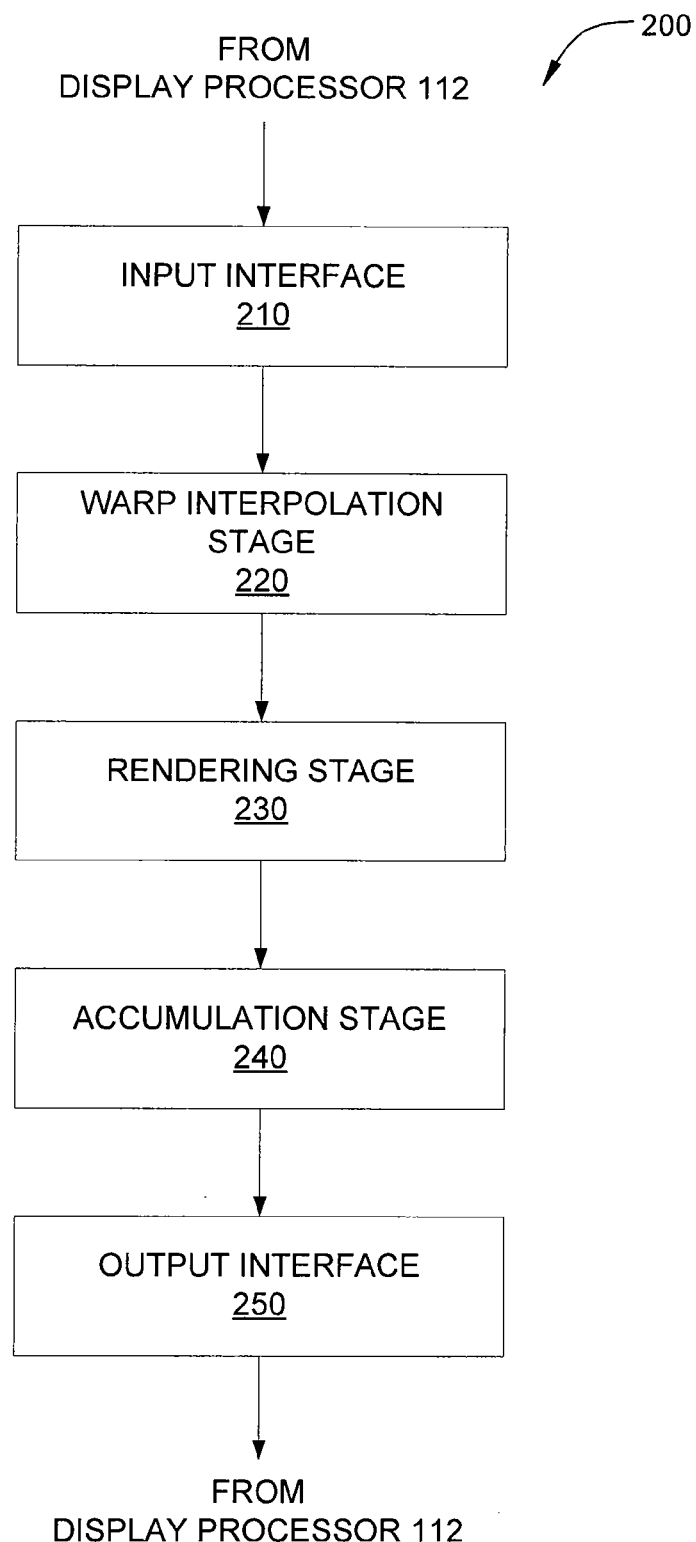
FIG. 2 illustrates a stereo to multiview rendering system as implemented within the display processor of FIG. 1, according to one embodiment.

FIG. 2 illustrates a stereo to multiview rendering system 200 as implemented within the display processor 112 of FIG. 1, according to one embodiment. As shown, the multiview rendering system 200 includes an input interface 210, a warp interpolation stage 220, a rendering stage 230, an accumulation stage 240, and an output interface 250.

The input interface 210 receives streams of stereo 3D images and associated left/right warp data into the multiview rendering system 200 in an interleaved manner. The input interface 210 deinterleaves the stereo 3D images into a left image, a right image, and left/right warp data, and transmits the deinterleaved data to the warp interpolation stage 220. In one embodiment, the input interface 210 may support a bandwidth of 3.6 Gbit/s, which is sufficient to transfer stereo 3D 1080p images at 30 fps, corresponding to a transfer rate of 3 Gbit/s. For warps with a resolution of 180×100, the warp data rate may be 2×180×100×21 bit×30 fps≈22.7 Mbit/s.

The warp interpolation stage 220 receives deinterleaved stereo 3D images and associated warp data from the input interface 210. The warp interpolation stage 220 first upsamples and rescales incoming stereo 3D image data. For example, the interpolation stage 220 could receive 180×100 images and then upsample and rescale the images to 1920× 1080 images using bilinear interpolation. The warp interpolation stage 220 interpolates and extrapolates the two upsampled views to generate the desired multiview images. In one embodiment, the warp interpolation stage 220 may generate nine views. The warp interpolation stage 220 then calculates the Jacobian and the target coordinates corresponding to the views. The warp interpolation stage 220 groups the calculated Jacobian and target coordinates with the input image pixels into packets. The warp interpolation stage 220 then transmits the resulting packets, comprising EWA splatting tasks, to the rendering stage 230.

The rendering stage 230 receives packets from the warp interpolation stage 220, where the packets include input image data and corresponding Jacobian and the target coordinates. The rendering stage 230 dispatches the incoming packets to multiple render units that compute subpixel data corresponding to the input packets, as further described herein. The rendering stage 230 transmits the output data from the render units to the accumulation stage 240.

The accumulation stage 240 receives the subpixel data from the rendering stage 230 and accumulates the subpixel data in a frame buffer. In one embodiment, the frame buffer includes two RAM banks per color channel. The accumulation stage 240 normalizes the frame buffer data and transmits the normalized data to the output interface 240.

The output interface 250 receives normalized frame buffer data from the accumulation stage 240. The output interface 250 performs data reformatting, according to the specifications of a corresponding multiview autostereoscopic display, such as the display device 110 of system 100. The output interface 250 then transmits the reformatted data to the multiview autostereoscopic display or stores the data in memory, such as memory within the display processor 112 or in system memory 104.

Figure 3:
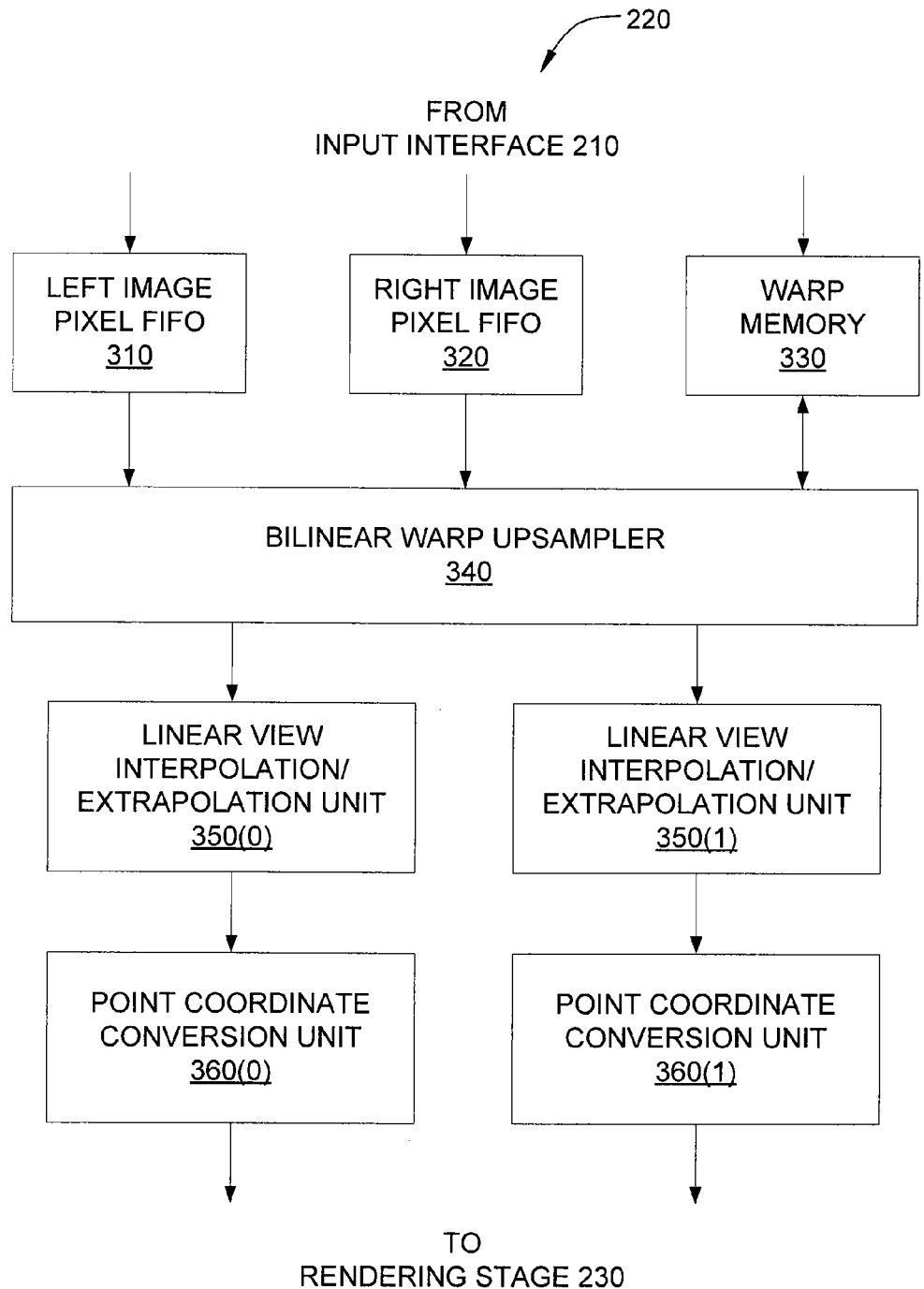
FIG. 3 illustrates the warp interpolation stage of the stereo to multiview rendering system of FIG. 2, according to one embodiment.

FIG. 3 illustrates the warp interpolation stage 220 of the stereo to multiview rendering system 200 of FIG. 2, according to one embodiment. As shown, the warp interpolation unit 220 includes a left image pixel FIFO 310, a right image pixel FIFO 320, a warp memory 330, a bilinear warp upsampler 340, linear view interpolation/extrapolation units 350, and point coordinate conversion units 360.

The left image pixel FIFO 310 receives incoming left image data from the input interface 210, and pipelines the left image data in a first-in-first-out (FIFO) memory. The left image pixel FIFO 310 transmits the delayed left image data to the bilinear warp upsampler 340 for further processing.

Correspondingly, the right image pixel FIFO 320 receives incoming right image data from the input interface 210, and pipelines the right image data in a FIFO memory. The right image pixel FIFO 320 transmits the delayed right image data to the bilinear warp upsampler 340 for further processing.

The warp memory 330 receives incoming warp data from the input interface 210, and stores the warp data in a memory. The bilinear warp upsampler 340 retrieves the warp data from the warp memory 330 for further processing.

The bilinear warp upsampler 340 upsamples and rescales the incoming warp data using bilinear interpolation. The bilinear warp upsampler 340 and following sections of the warp interpolation stage 220 process the warp data in quadmesh format. In this embodiment, the quadmesh is represented by the mesh vertices of the quadmesh, from which four neighboring vertices form a quadrilateral. A quadrilateral of a pixel-dense quadmesh covers the area of exactly one image pixel. Such a quadmesh format allows for a simple calculation of the Jacobian (where the Jacobian is a first derivative matrix of the warp function) and the coordinate of the pixel covered by a quadmesh using finite differences. In some embodiments, the Jacobian is a 2×2 matrix.

The linear view interpolation/extrapolation units 350 interpolate and extrapolate the upsampled left/right warps to generate data corresponding to the views of the multiview autostereoscopic display. Each of the interpolation/extrapolation units 350(0) and 350(1) transmits the calculated view data to the respective point coordinate conversion units 360(0) and 360(1).

The point coordinate conversion units 360(0) and 360(1) receive interpolated/extrapolated view data from corresponding linear view interpolation/extrapolation units 350(0) and 350(1). The point coordinate conversion units 360 convert the quadmesh format of the received view data into a target coordinate and a Jacobian using finite differences, as further described herein. The point coordinate conversion units 360 group the view number, the calculated Jacobian, and the target coordinates with the associated input image pixel data into packets. The point coordinate conversion units 360 then transmit the resulting packets, comprising EWA splatting tasks, to the rendering stage 230.

Although two interpolation/extrapolation units 350(0) and 350(1) and two point coordinate conversion units 360(0) and 360(1) are shown, the actual quantity of linear view interpolation/extrapolation units 350 and point coordinate conversion units 360(0) and 360(1) may be based on the number of desired views and the complexity of the calculations. For example, if four dense warps are generated from each of the two input warps, then the warp interpolation stage 220 would generate two EWA splatting tasks during each cycle to achieve the desired throughput.

Figure 4:
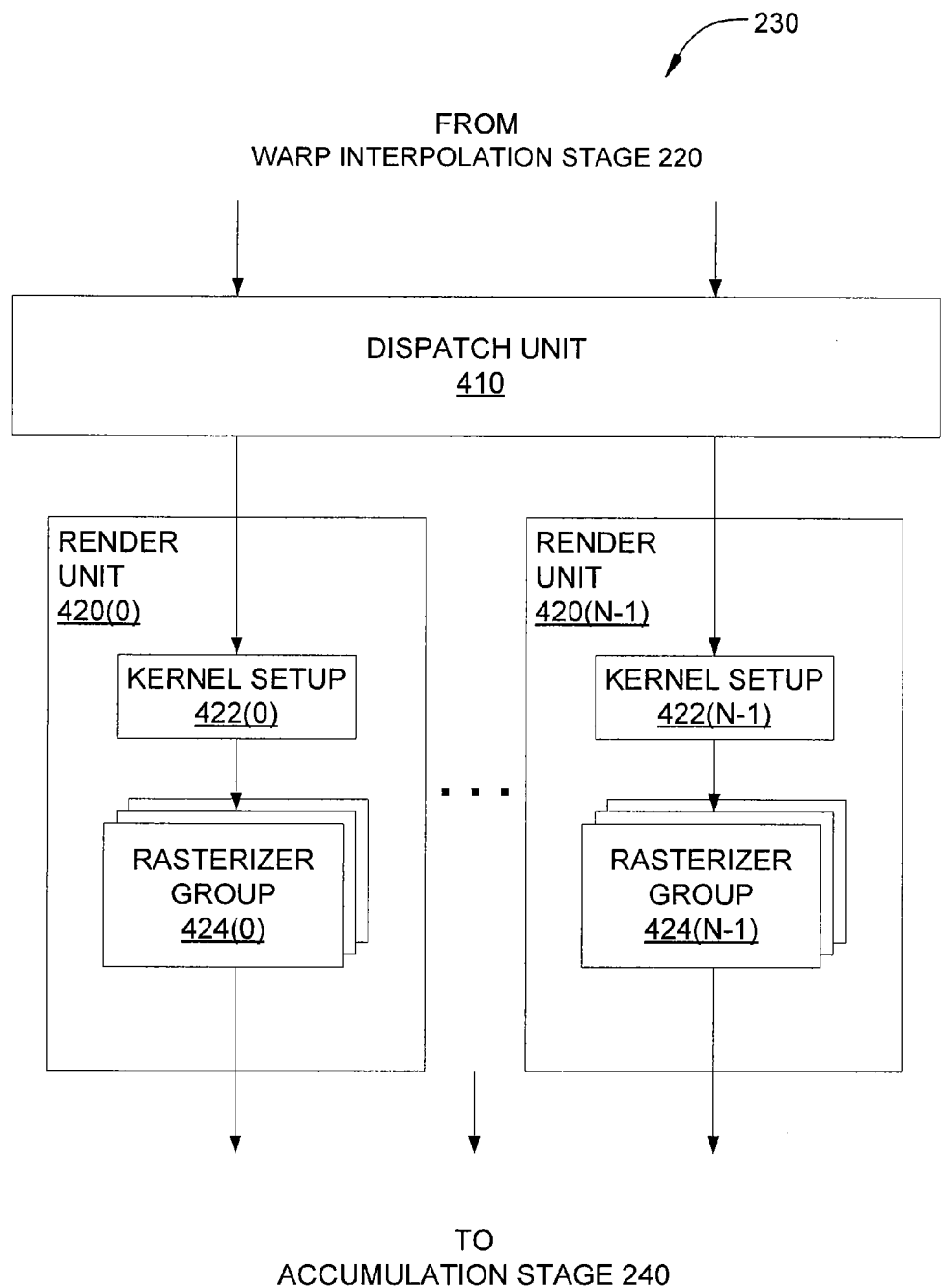
FIG. 4 illustrates the rendering stage of the stereo to multiview rendering system of FIG. 2, according to one embodiment.

FIG. 4 illustrates the rendering stage 230 of the stereo to multiview rendering system 200 of FIG. 2, according to one embodiment. As shown, the rendering stage 230 includes a dispatch unit 410 and render units 420.

The dispatch unit 410 receives packets, comprising EWA splatting tasks, from the point coordinate conversion units 360 of the warp interpolation stage 220. The dispatch unit 410 then routes each packet to a corresponding render unit 420. The dispatch unit 410 routes each packet to a corresponding render unit 420 using any technically feasible approach, including, without limitation, a round-robin technique, or a priority-based technique. In one example, each packet could be associated with a particular view of the multiview autostereoscopic display. Each packet could be identified by the view number to which the packet belongs. The dispatch unit 410 would retrieve the view identifier for an incoming packet and would route the incoming packet to the render unit 420 that is tasked with rendering the view specified by the view identifier.

The render units 420 receive a portion of the received EWA splatting tasks from the dispatch unit 410. The rendering stage includes N render units numbered from render unit 420(0) through render unit 420(N−1). The actual quantity of render units depends on various factors including, without limitation, the number of generated views, the image resolution, and the desired system throughput. For example, the rendering stage 230 could include nine render units 420, where each render unit 420 performs operations associated with one of nine generated views $\in[0, \ldots, 8]$. Accordingly, the dispatch unit 410 would dispatch packets associated with the first view to render unit 420(0), packets associated with the second view to 420(1), packets associated with the third view to render unit 420(2), and so on. As shown, each of the render units 420(0)-420(N−1) includes a corresponding kernel setup 422(0)-422(N−1) and rasterizer group 424(0)-424(N−1), where each rasterizer group 424(0)-424(N−1) includes one or more rasterizers.

The kernel setup 422 receives dispatched EWA splatting tasks from the dispatch unit 410. The kernel setup iteratively prepares Gaussian filter kernels for evaluation in the rasterizer group 424.

The rasterizer group 424 receives prepared Gaussian filter kernels from the kernel setup 422. The rasterizer group 424 evaluates only those subpixels that appear in the final interleaved multiview autostereoscopic image for a given view (valid subpixels). The rasterizers in the rasterizer group 424 are configured to pre-calculate the indices of the valid subpixels in the sparse interleaving pattern. This approach allows for efficient rasterization since the rasterizers may jump from the current valid index to the next valid index in a single step.

The actual quantity of rasterizers in the rasterizer group 424 depends on various factors including, without limitation, the number of generated views, the image resolution, and the desired system throughput. For example, each render unit 420 could process one EWA splatting task in sufficient time to achieve a throughput of 75 Msplat/s. Such a throughput would be sufficient to resample 1080p images at 30 frames/s (fps), in that 1080p at 30 fps would correspond to a throughput of 62.21 Msplat/s. In this example, twelve subpixels would be rasterized per splat, on average, when eight views are enabled. If each rasterizer could have a throughput of one subpixel per cycle, and each rasterizer could process one splat in twelve cycles, three rasterizers would be allocated per render unit 420 to achieve the desired throughput. The rasterizer groups 424(0)-424(N−1) send rasterized subpixels to corresponding L1 caches 510(0)-510(N−1) in the accumulation stage 240.

Figure 5:
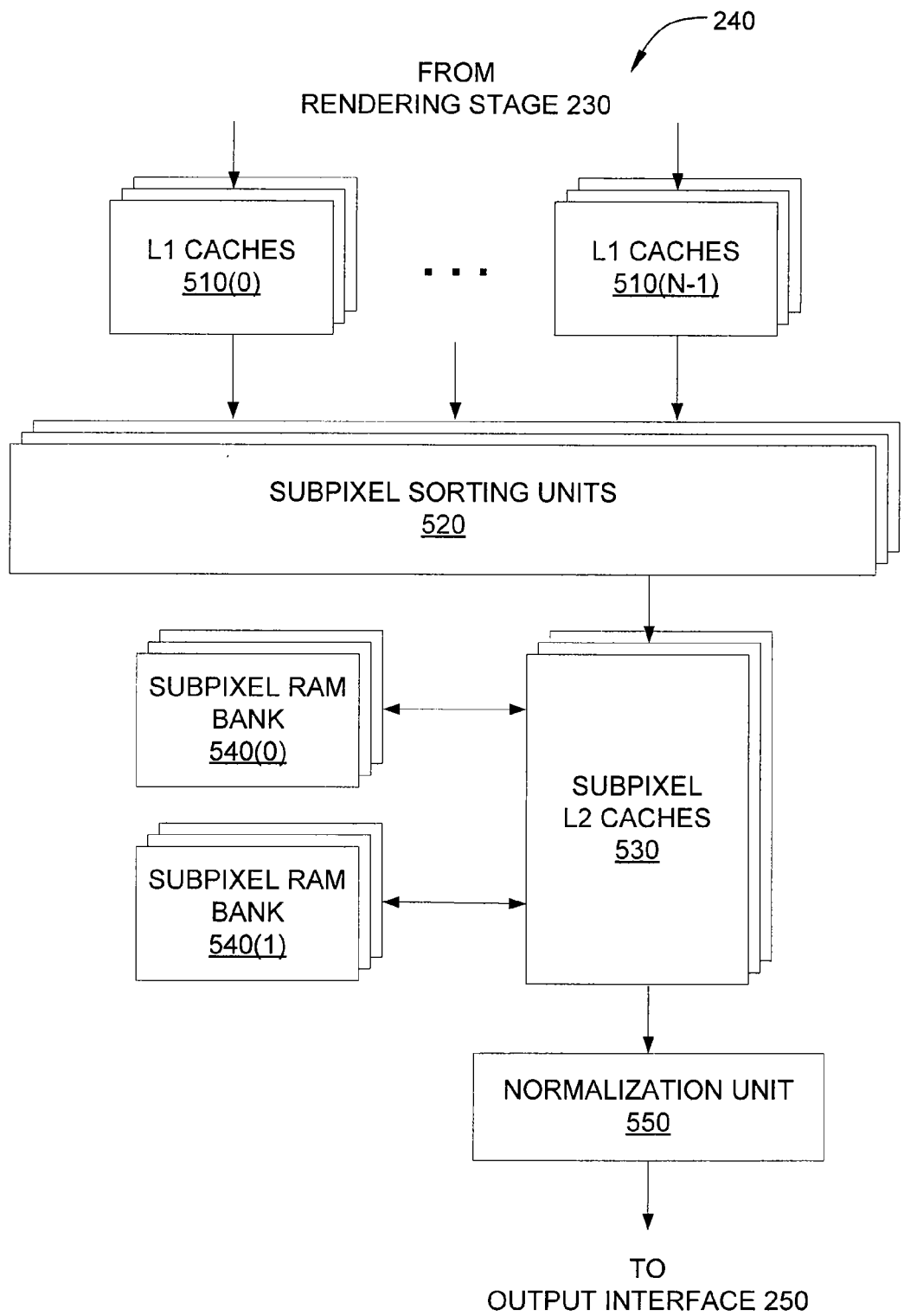
FIG. 5 illustrates the accumulation stage of the stereo to multiview rendering system of FIG. 2, according to one embodiment.

FIG. 5 illustrates the accumulation stage 240 of the stereo to multiview rendering system 200 of FIG. 2, according to one embodiment. As shown, the accumulation stage includes L1 caches 510, subpixel sorting units 520, a frame buffer comprising subpixel L2 caches 530, subpixel RAM banks 540, and a normalization unit 550.

The L1 caches 510(0)-510(N−1) receive rasterized subpixels from corresponding rasterizer groups 424(0)-424(N−1) in the rendering stage 230. Although only the subpixels viewable in the final multiview image are evaluated by the render units 420 in the rendering stage 230, the total quantity of evaluated subpixels accumulated by the L1 caches may still be relatively high. For example, if the output image resolution is 1080p at 30 fps with eight enabled views, then the quantity of accumulated subpixels would be 8×1920×1080×30×4=1.99 Gsubpixels/color channel. If the accumulation stage 240 accumulates subpixels at a 300 Mhz clock rate, then 1.99 Gsubpixels/300 MHz=6.63 subpixel values would be accumulated per color channel, during each clock cycle. Subsequent splats of the same view may exhibit significant overlap. This significant overlap may be leveraged to reduce the accumulated subpixel rate by placing the L1 caches 510, configured as small fully-associative subpixel-caches, immediately subsequent to the rasterizer groups 424 in the rendering stage 230.

In one embodiment, subsequent splats of an eight-view image may exhibit approximately 82.3% overlap. The L1 caches 510 include six associative pixels and may reduce the required accumulations by approximately 1/(100%−82.3%)=5.6. If one of the L1 caches 510 has no available space, then the least recently used subpixel in this L1 cache 510 is sent to the subpixel sorting units 520. The corresponding storage location in the L1 cache 510 is then freed or overwritten with new subpixel data.

The subpixel sorting units 520 receive subpixels from the L1 caches 510 and sort the subpixels based on screen position. In one embodiment, the subpixel sorting units 520 transmit each subpixel to an "even" or "odd" channel of the subpixel L2 cache 530, depending on whether the x-coordinate of the subpixel is even or odd.

The subpixel L2 caches 530 serve as the frame buffer for the stereo to multiview rendering system 200. The subpixel L2 caches 530 are implemented as a sliding window that automatically adjusts position depending on the addresses of the incoming subpixels. The incoming images represent different views of the same scene or camera angle, where each view may be separated by a few degrees with respect to another view. As such, the incoming images may be expected to have a high degree of correlation with respect to each other. Because of this high degree of correlation, assumptions regarding the geometric arrangement of the autostereoscopic views may reduce the portion of the screen space that need be stored in the subpixel L2 caches 530 at a given time. According, the subpixel L2 caches 530 may be sized to store a small portion, such as twenty-five rows, of the output image on chip, reducing or eliminating the need for external memory frame buffer memory.

The subpixel RAM banks 540 provide storage for column interleaving using two subpixel RAM banks 540 per color channel. In one embodiment, subpixels with an even x-coordinate are allocated to bank 0 and subpixels with an odd x-coordinate are allocated to bank 1. This column interleaving approach may be employed in order to provide sufficient bandwidth to support two subpixels per cycle per color channel.

The normalization unit 550 performs a normalization function on subpixels received from the subpixel L2 caches. Individual transformation of the input pixels according to the EWA splatting algorithm may lead to normalization errors in the output image. Accordingly, the subpixels are accumulated together with corresponding EWA filter weights throughout the accumulation stage 240. After rendering, output image pixels are normalized in the normalization unit 550 by dividing the accumulated values by the corresponding weight. The normalization unit 550 transmits normalized subpixels to the output interface 250.

Figure 6A:
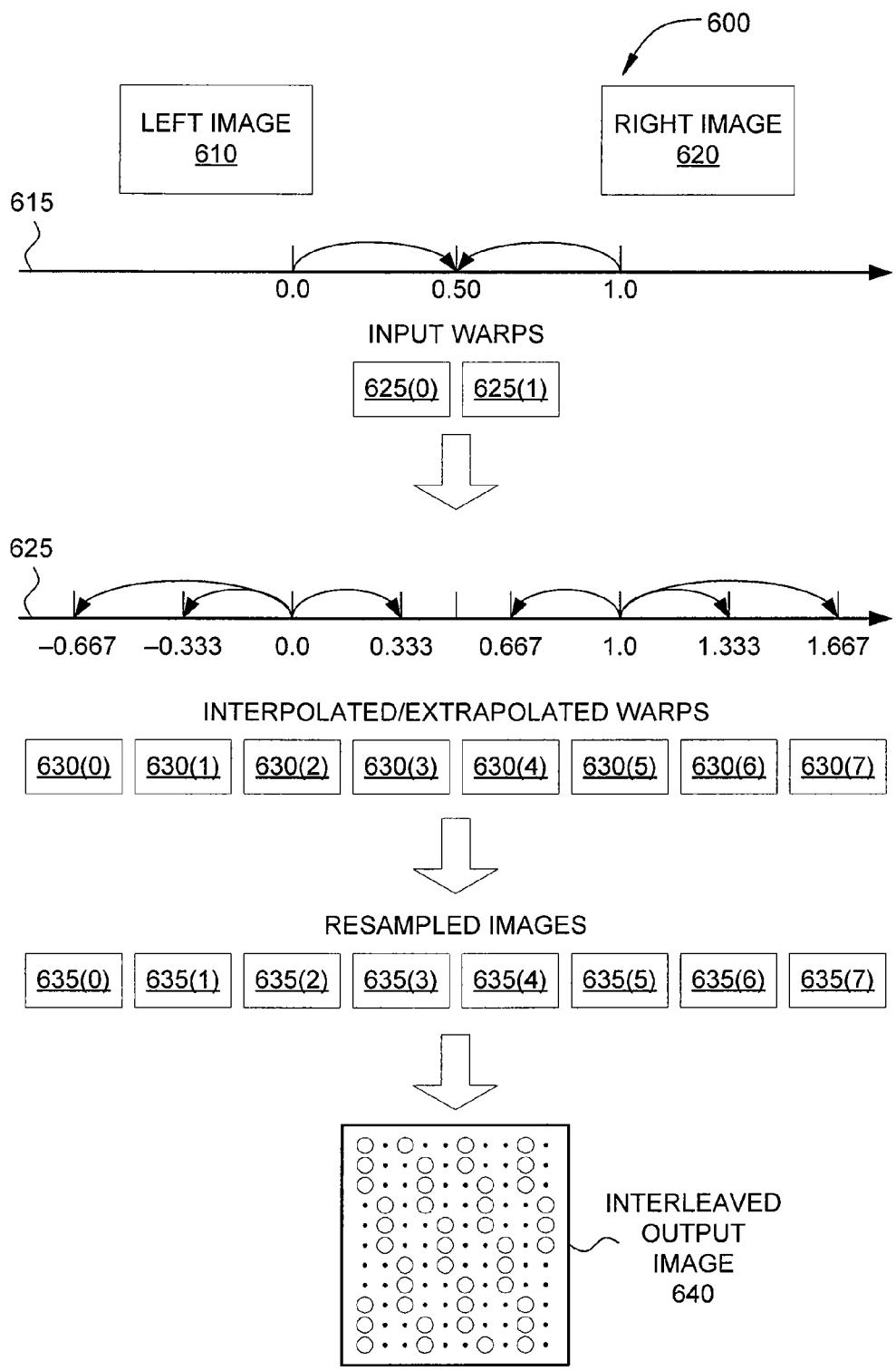
FIG. 6A illustrates the generation of interpolated and extrapolated warps using the warp interpolation unit of FIG. 3, according to one embodiment.

FIG. 6A illustrates the generation of interpolated and extrapolated warps using the warp interpolation unit of FIG. 3, according to one embodiment. As shown, the illustration 600 includes a left image 610, a right image 620, input warps 625, interpolated and extrapolated warps 630, resampled images 635, and an interleaved output image 640.

Rendering of multiview autostereoscopic images from stereo 3D images proceeds in three steps, according to one embodiment. First, the stereo to multiview rendering system 200 interpolates and extrapolates the two input warps 625 to the desired view positions. As shown in FIG. 6A, the left input image 610 is located at position 0.0 on the normalized baseline 615, and the right input image 620 is located at position 1.0 on the normalized baseline 615. The input warps 625 are coordinate maps that map the input images 610 and 620 to a position that lies between 0.0 and 1.0 on the normalized baseline, where 0.0 and 1.0 are normalized values that signify a "left camera position" and a "right camera position." The eight view positions shown on warp baseline 625 are relative to these two normalized positions. As such, the eight view position values are one example of a view position set for a particular display device. In general, each display device may have a different set of view positions that varies between one display device and another display device. Typically, the set of view positions are spaced equally over a given interval. As shown in FIG. 6A, the eight view positions along warp baseline 625 are equally spaced over the interval is [−0.667, . . . , 1.667]. The stereo to multiview rendering system 200 linearly interpolates and extrapolates the left image warp 625(0) and right image warp 625(1) to generate additional warps at various view positions. The various view positions are display dependent. For example, as shown in FIG. 6A, the warps could be interpolated to positions [−0.667, −0.333, 0.0, 0.333, 0.667, 1.0, 1.333, and 1.667], respectively, as shown on warp baseline 625.

Second, the stereo to multiview rendering system 200 applies the output warps to the left image 610 and the right image 620 at the various view positions, as shown on the baseline 625, respectively, to generate the interpolated and extrapolated output images 630. The interpolated and extrapolated output images 630(0), 630(1), 630(2), 630(3), 630(4), 630(5), 630(6), and 630(7) correspond to view positions −0.667, −0.333, 0.0, 0.333, 0.667, 1.0, 1.333, and 1.667, respectively. Third, the stereo to multiview rendering system 200 resamples the resulting interpolated and extrapolated output images 630 to generate corresponding resampled images 635. Fourth, the stereo to multiview rendering system 200 interleaves the resulting resampled images 635 to generate a final interleaved output image 640. In some embodiments, each of the interpolated and extrapolated output images 630 and the resampled images 635 include only those pixels that are visible in the final interleaved output image 640. These steps are further described below.

An image warp may be described using a non-linear, two dimensional mapping $m(u): u \in \mathbb{R}^2 \rightarrow m(u) \in \mathbb{R}^2$, where u is the two dimensional coordinate in the input image, and a linearized index k indicates when this coordinate is a discrete sampling point $u_k$, that is, when the coordinate lies at a pixel position. If $m^{\alpha_0}(.)$ denotes the input warp that maps the corresponding input image to the relative position $\alpha_0$ on the normalized baseline, then the warp may be linearly interpolated and extrapolated to other view positions according to Equation 1 below:

$$m^{\alpha_n}(u)_k = \left(1 - \frac{\alpha_n}{\alpha_0}\right) \cdot u_k + \frac{\alpha_n}{\alpha_0} \cdot m^{\alpha_0} u_k \qquad \text{Equation 1}$$

where $\alpha_n$ is the desired position on the baseline of view n. In general, the image warps have a lower resolution than the original images. In one example, the warps could have a resolution of 180×100 and the corresponding images could have a resolution of 1920×1080. Accordingly, the input warps are up-sampled using bilinear interpolation prior to the actual view interpolation and extrapolation.

After the interpolated and extrapolated views are generated, the corresponding images are resampled using EWA splatting, which is a forward-mapping method. As such, warps are generated in forward format, and no warp inversion is needed. The EWA framework uses Gaussian filter kernels and the Jacobian of the image warp as a local deformation measure in order to calculate the footprint of an input image pixel translated to the output image. Accordingly, the input pixels correspond to Gaussian regions, or splats, in the output image, which are rasterized within a bounding box and accumulated in a frame buffer. Since Gaussians are closed among themselves and under affine transformations, an anti-aliasing filter for the output image sampling grid may be readily incorporated analytically. The image resampling and anti-aliasing phase includes applying an EWA filter kernel, post normalization, parameterization, and display anti-aliasing.

When applying the EWA filter kernel, $w_k$ may represent the input pixel value at position $u_k \in \mathbb{N}^2$, where k is a linear pixel index. Without loss of generality, $w_k$ may be assumed to be scalar. As described above, m(u) denotes the image warp. If $J_k$ is the Jacobian of the warp at pixel position $u_k$, then the EWA kernel may be characterized by the covariance matrix given by Equation 2 below:

$$\Sigma_k = J_k V_I J_k^T + V_{aa} = C_k + V_{aa} \qquad \text{Equation 2}$$

in the target image domain, where the first term is the transformed interpolation kernel, and the second term is the anti-aliasing kernel. The terms $V_I = \text{diag}(\sigma_i^2, \sigma_i^2)$ and $V_{aa} = \text{diag}(\sigma_{aa}^2, \sigma_{aa}^2)$ represent diagonal covariance matrices that parameterize the interpolation and anti-aliasing filters, respectively. The weight of the Gaussian filter at the discrete position $x_j \in \mathbb{N}^2$ in the output image is then given by Equation 3 below:

$$\rho_{jk} = \frac{|J_k|}{2\pi\sqrt{|\Sigma_k|}} e^{\left(-0.5(x_j - m(u_k))\Sigma_k^{-1}(x_j - m(u_k))\right)} \qquad \text{Equation 3}$$

and is multiplied with the pixel value $w_k$.

A post-normalization process is then performed because the individual transformation of the input pixels can lead to normalization problems in the output image. In performing the post-normalization process, the filter weights $\rho_{jk}$ are accumulated along with the pixel values $\rho_{jk} \cdot w_k$. At the end of the rendering process, the output image pixels $p_j$ are calculated by dividing the accumulated values by the corresponding weight, as shown by $p_j = (\Sigma_{\forall k} \rho_{jk} \cdot w_k)/(\Sigma_{\forall k} \rho_{jk})$.

In one example, the filter parameterization $\sigma_i \approx 0.39$ could lead to an optimal L2 fit of a Gaussian to the ideal low-pass filter in the frequency domain for a regular, quadratic sampling grid. In this example of EWA splatting, the value of $\sigma_{aa}$ would be set to the value $\sigma_{aa} \approx 0.39$. However, this approach would add blurring even in areas where no anti-aliasing is needed. Accordingly, the filter parameterization $\sigma_{aa}^2$ could be selected in an adaptive manner such that anti-aliasing is performed only when needed. In this approach, the need for anti-aliasing is identified by determining whether the spread of the transformed filter kernel defined by $C_k$ is smaller than the low-pass filter kernel of the output sampling grid (as defined by $V_{aa}$). The adaptive selection may be achieved by thresholding the semi-axes of the ellipse defined by $C_k^{-1}$. First, an Eigendecomposition of $C_k$ may be used to determine the semi-axes: $C_k = D_k U_k D_k^T$, where that $C_k$ is real and symmetric. Second, the threshold rule $\tilde{U}_k^{ii} = \max(U_k^{ii}, \sigma_{aa}^2)$ may be applied, and finally, the adaptive kernel may be obtained as $\Sigma_k = D_k \tilde{U}_k D_k^T$. In other words, the ellipse defined by $C_k^{-1}$ outside the circle with a radius of $\sigma_{aa}$ is preserved. The relationship of the ellipse and the circle is inverse in the frequency domain: that is, the ellipse defined by $C_k$ in the frequency domain is prevented from getting larger than the circle with a radius of $1/\sigma_{aa}$ in the frequency domain. This approach band-limits the filter kernel to avoid introduction of excessively high frequency data. However, for the approaches described herein, the covariance matrices are diagonally dominant. Accordingly, a simplified adaptive scheme, that does not need an Eigendecomposition, may be used according to the threshold rule presented in Equation 4 below:

$$\Sigma_k = \begin{bmatrix} \max(C_k^{00}, V_{aa}^{00}) & C_k^{01} \\ C_k^{10} & \max(C_k^{11}, V_{aa}^{11}) \end{bmatrix} \quad \text{Equation 4}$$

where the superscripts are the element indices, as shown in the matrix, and $\sigma_i = \sigma_{aa} = 0.39$.

Display anti-aliasing is performed to reduce or prevent aliasing when interleaving the resampled views into a single image, according to a special interleaving pattern for simultaneous display on a multiview autostereoscopic display.

The anti-aliasing filters are generally non-separable, and a high-order filter is typically needed to approximate the intricate shape of the passband. However, for natural images, the benefit of such high-order filters may be rather small. Accordingly, simpler separable filters may generate visually pleasing results, at a lower computational cost. Because Gaussians are closed, a Gaussian display pre-filter may be analytically incorporated into the EWA filter kernel. Rather than using adaptive EWA splatting with $\sigma_{aa} = 0.39$, this value is adapted with the density $d = 1/|\Lambda|$ of the display sampling lattice $\Lambda$, as shown in equation 5 below:

$$\sigma_{disp}^2 = \sigma_{aa}^2 / d = \sigma_{aa}^2 \cdot |\Lambda| \quad \text{Equation 5}$$

where $\sigma_{disp}^2$ is replaces $\sigma_{aa}^2$. In one example, a display with a density of ⅛ would result in $\sigma_{disp}^2 \approx 1.22$.

In one embodiment, anisotropic anti-aliasing may be possible by defining two different variances on the diagonal $V_{aa} = \text{diag}(\sigma_{disp1}^2, \sigma_{disp2}^2)$. Such an approach may be useful in applications where EWA splatting is used to directly render other interleaved images, such as column or row interleaved stereo images.

Selecting an appropriate resampling strategy for multiview autostereoscopic imagery involves a tradeoff among computational complexity, memory consumption, and image quality. Resampling may be performed in real-time at high-resolution and frame rate may be achieved at an acceptable quality level. In particular, pre-filtering provides good image quality at relatively lower computational complexity, irrespective of the input image resolution.

A pre-filtering approach also provides good scalability with respect to the number of views, because the only those pixels that are in the final interleaved display matrix are calculated. With pre-filtering, high quality filtering may be performed on the input images. Although higher visual quality may be achieved by post-filtering using high resolution input images, post-filtering approaches suffer from higher computational complexity and may not support real-time calculation at high resolutions and frame rates.

Figure 6B:
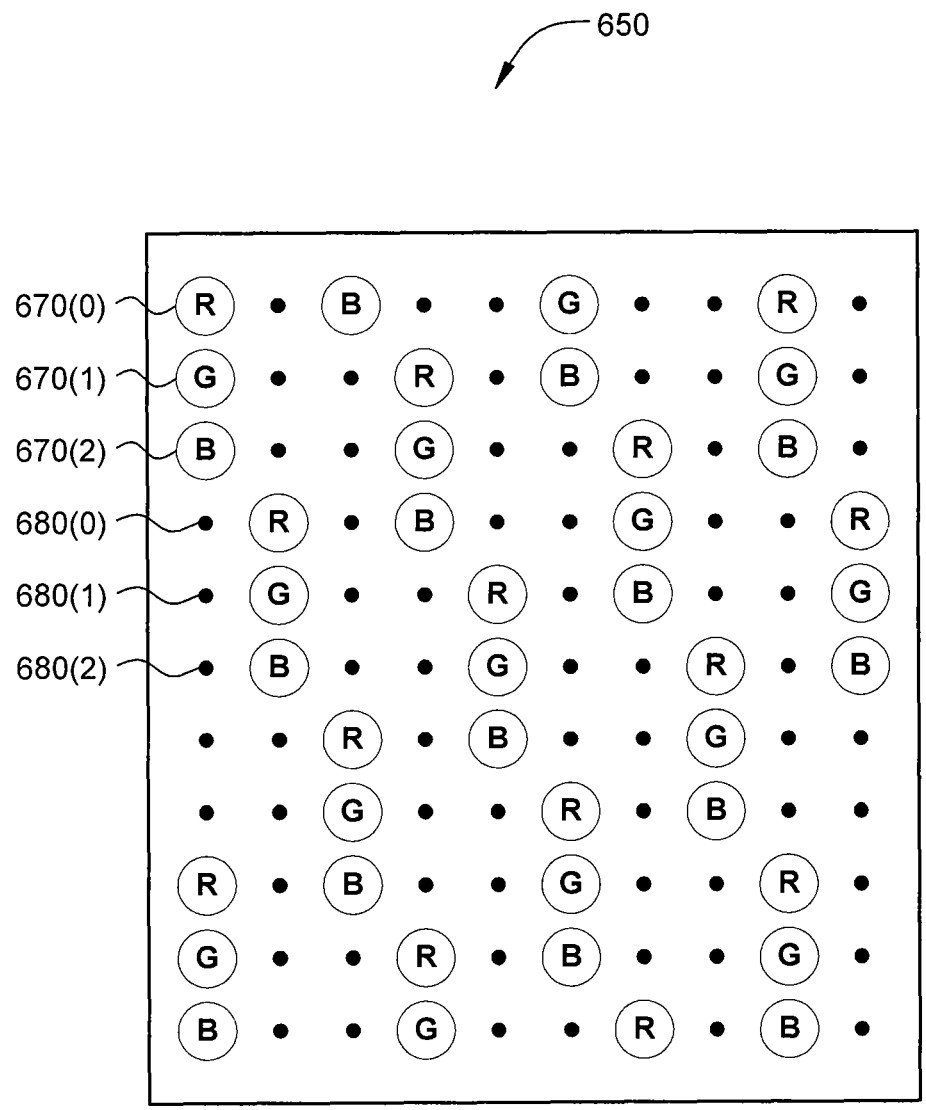
FIG. 6B illustrates one view in an interleaved pattern for displaying images on a multiview autostereoscopic display, according to one embodiment.

FIG. 6B illustrates one view 650 in an interleaved pattern for displaying images on a multiview autostereoscopic display, according to one embodiment. As shown, the view 650 includes in-view subpixels 670 and out-of-view subpixels 680.

The view 650 may correspond to any one of the interpolated and extrapolated output images 630(0), 630(1), 630(2), 630(3), 630(4), 630(5), 630(6), and 630(7) of FIG. 6A. The in-view subpixels 670 are those subpixels that appear in the interleaved output image 640 for the view 650. The out-of-view subpixels 680 are those subpixels that appear in the interleaved output image 640 for a view other than the view 650. Each of the separate views covers a different set of non-overlapping subpixels in the interleaved output image 640. After the view 650 and the other views are generated, the resulting views are interleaved to create the interleaved output image 640.

In some embodiments, a pixel position corresponding to a particular view may not include a red subpixel, a green subpixel, and a blue subpixel that all correspond to the same view. For example, a particular pixel position could include a red subpixel and a green subpixel that correspond to one view and a blue subpixel that corresponds to a different view.

The special interleaving pattern of multiview autostereoscopic displays may be described or approximated using a non-orthogonal sampling lattice $\Lambda$. A corresponding inverse lattice $\Lambda^*$ exists in the frequency domain. In order to resample an image onto a non-orthogonal lattice $\Lambda$ without aliasing artifacts, the image may be band-limited to a primitive cell of the inverse lattice $\Lambda^*$. In one embodiment, this primitive cell may have a hexagonal shape, as further described herein.

Figure 7:
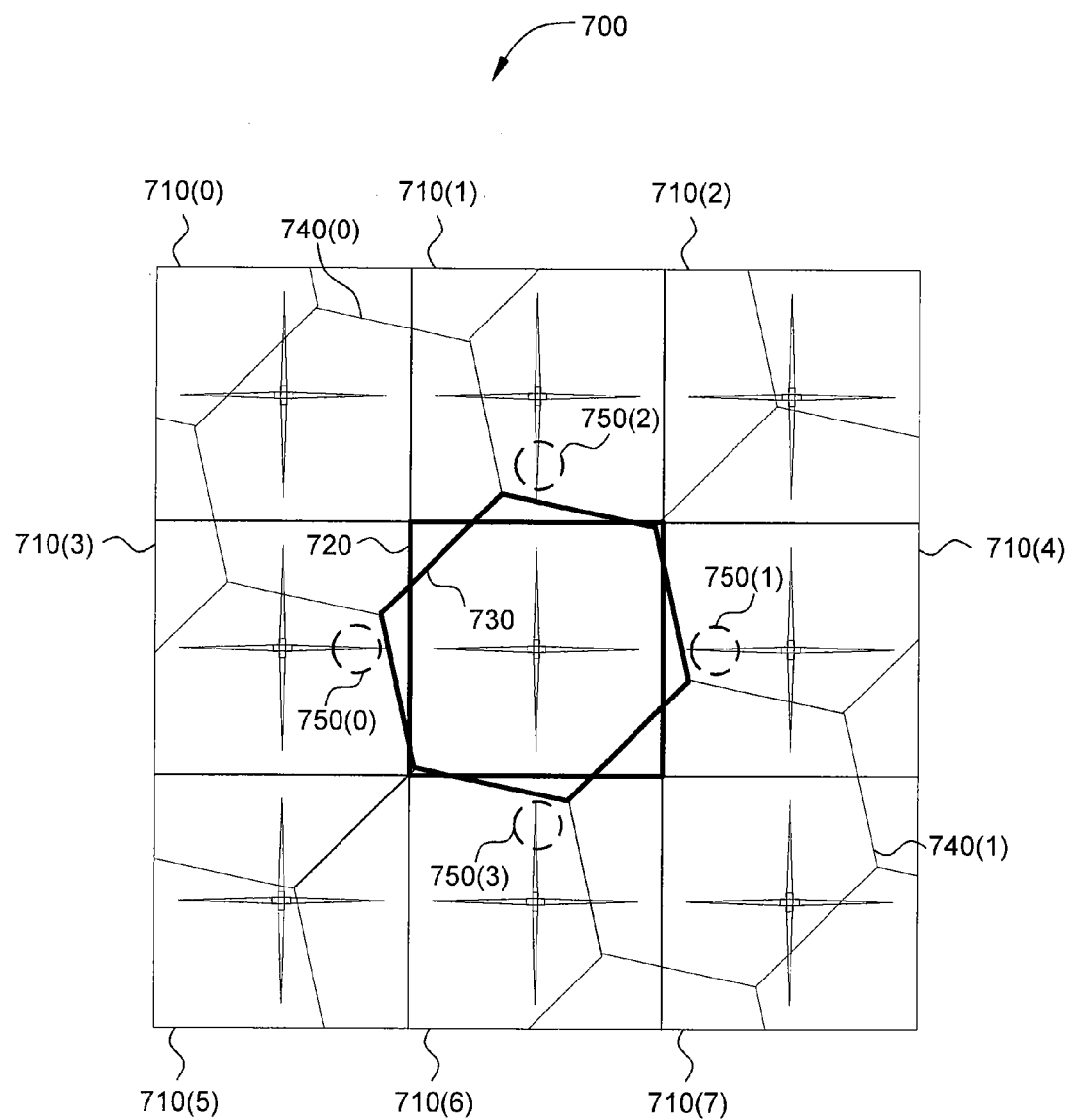
FIG. 7 illustrates a Fourier domain of an orthogonally sampled input image, overlaid with a primitive cell of the inverse output sampling lattice, according to one embodiment.

FIG. 7 illustrates a Fourier domain 700 of an orthogonally sampled input image, overlaid with a primitive cell 730 of the inverse output sampling lattice, according to one embodiment. As shown, the Fourier domain 700 includes a centered input image spectrum 720 as well as the periodic copies 710 of the centered input image spectrum 720. Further, a primitive cell 730 of the inverse sampling lattice is overlaid, together with the periodic copies a primitive cell 730, as illustrated by representative hexagonal cells 740(0) and 740(1). As further described herein, resampling of the orthogonally sampled input image on a non-orthogonal output image grid may lead to aliasing artifacts with a directionality change if spectral components 750 outside of the primitive cell 730 are not suppressed sufficiently. Although, only a portion of the Fourier domain is illustrated in FIG. 7, the actual periodic spectrum extends to infinity.

In resampling a single view, an image warp may be defined as a continuous mapping $x = m(u)$ that maps any coordinate $u \in \mathbb{R}^2$ from the input domain to a location $x \in \mathbb{R}^2$ in the output domain. In order to transform a discrete input to a discrete output, four steps are generally employed. First, a continuous signal $f_{in}^C(u)$ is reconstructed by applying an interpolation filter $h_i$ to the discrete input. Second, the continuous signal is warped to $f_{warp}^C(x)$ using $m(u)$. Third, an anti-aliasing filter $h_{aa}$ is applied to achieve an aliasing-free output signal $f_{aa}^C(x)$. Finally, this signal is sampled to form the discrete output image.

Image sampling is typically performed using orthogonal sampling grids. By contrast, multiview autostereoscopic displays typically employ slanted lenticular lenses to achieve view multiplexing. As such, sampling grids for multiview autostereoscopic displays are typically non-orthogonal or irregular. As such, classical sampling theory may not be applied to define the anti-aliasing filter $h_{aa}$ in such cases. An ideal filter limits the frequency content to a primitive cell of the inverse sampling lattice. In general, the ideal filter for a multiview autostereoscopic display results in non-separable anti-aliasing filters with an intricate shape. For example, the lattice shown in FIG. 6B may result in a filter with a hexagonally shaped frequency response. However, for natural images, this ideal filter may be approximated using more efficient separable filters.

Due to the view-multiplexing of multiview autostereoscopic displays, the effectively used resolution of each input view is often typically much smaller than the overall output image resolution. More formally, a resolution ratio between the input images and the interleaved output image may be defined as the quotient of the density of the respective sampling lattices of the input and output images. This ratio is denoted herein as $\rho(\Lambda_1,\Lambda_2)=d_2/d_1$, where $d_1$ and $d_2$ are the corresponding densities of the lattices $\Lambda_1$ and $\Lambda_2$, respectively. As such, the ratio describes a change in resolution for non-orthogonal sampling grids such as downsampling, if $\rho(\Lambda_1,\Lambda_2)<1$, or upsampling, if $\rho(\Lambda_1,\Lambda_2)>1$.

Because there is generally no closed-form analytical expression for the rendering equation $f_{view}^D(x)$ that is usable in practice, the rendering equation is typically approximated with non-ideal filters and intermediate rasterization steps, giving rise to resampling artifacts such as blur and aliasing. Blur occurs due to attenuation in the filter passband and may be reduced by using higher order filters. Aliasing occurs due to insufficient attenuation in the stop band, causing components of the periodic spectrum of the input image to alias back into the passband upon re-sampling. Aliasing artifacts are particularly noticeable in multiview resampling applications due to non-orthogonal sampling grids. Two potential sources for aliasing are non-orthogonal display sampling and warp transformation, each of which is now described in turn.

Figure 8:
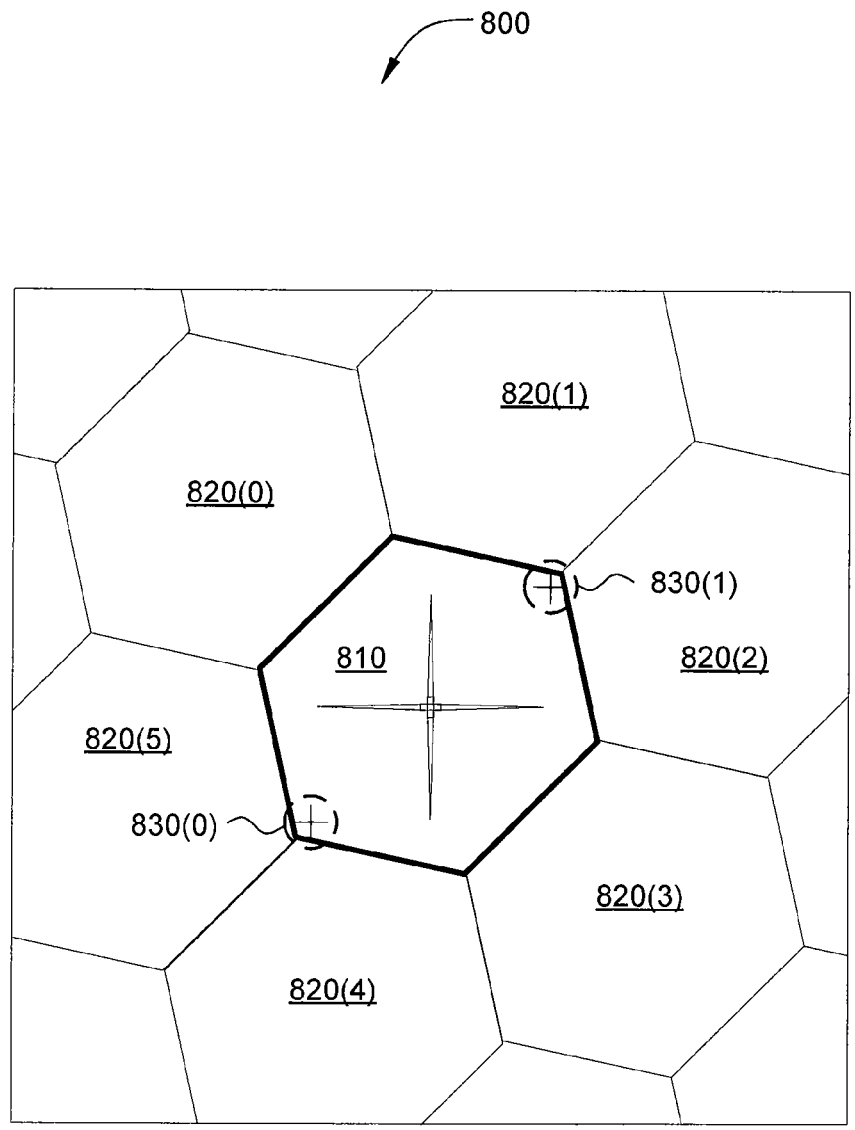
FIG. 8 illustrates a Fourier domain of a non-orthogonally sampled output image with aliased frequency components, according to one embodiment.

FIG. 8 illustrates a Fourier domain 800 of a non-orthogonally sampled output image with aliased frequency components 830, according to one embodiment. As shown, the Fourier domain includes the primitive cell 810 of the inverse sampling lattice, the periodic copies 820 of the primitive cell, as well as aliased frequency components 830. The primitive cell 810, periodic copies 820, and aliased frequency components 830 function substantially the same as corresponding elements described in conjunction with FIG. 7, except as further described below.

Aliasing artifacts due to non-orthogonal sampling may be analyzed by making the simplifying assumptions of a unit mapping m(u)=u and similar sampling densities between the input and view images $\rho(\Lambda_{in},\Lambda_{view})\approx 1$. In such cases, the interpolation filter $h_i$ and the anti-aliasing filter $h_{aa}$ may be combined into a single resampling filter $h_{i\_aa}=h_i*h_{aa}$. When a low-order separable filter, such as the bilinear kernel, is used, aliasing may appear due to the mismatch in bandwidth shape. While this effect may be negligible for orthogonal sampling lattices, such an effect may be more visible for non-orthogonal lattices. As the spectral copies 740 of the primitive cell 730 are distributed non-orthogonally, insufficiently attenuated components 750 of the spectral copies 710 of the input image spectrum 720 may alias onto very different frequency regions 830 upon sampling on the non-orthogonal grid. As a result, aliasing patterns with different directionality may be visible in the output image. Such aliasing effects may be mitigated using various approaches, as further described below.

Aliasing due to the warp transformation may result in similar, but more localized, artifacts as compared with aliasing artifacts due to non-orthogonal sampling. These artifacts may occur in regions that are more heavily compressed. In stereo 3D to multiview conversion, this type of aliasing is typically less visible, since image compressions are typically performed in less salient regions such as backgrounds or uniform regions. Furthermore, in stereo 3D applications, transformations are generally restricted to horizontal translations since the transformations originate from horizontal disparities.

Two distinct approaches may be used to mitigate aliasing due to the non-orthogonal sampling: (1) spectral copies may be attenuated by using a higher order combined filter or (2) spectral copies may be spaced further apart by using oversampled input images. If a unit mapping is employed, either technique may be integrated into the resampling pipeline in one single step. However, when using arbitrary transformation mappings m(u), rather than a unit mapping, combining $h_i$ and $h_{aa}$ may be computationally challenging, since typical filter kernels may not be transformed analytically.

Accordingly, in one embodiment, interpolation may be performed with a low order interpolation kernel $h_i$, and a high quality post-filter $h_{post}$ is applied to the transformed image. This post-filter may be independent of the transformation and may be implemented efficiently. Aliasing artifacts due to the warp may not be visible in this setting, as no directionality change occurs when the transformed image is sampled on the orthogonal grid $\Lambda_{post}$. Accordingly, anti-alias filtering may not strictly be required, but anti-alias filtering may be performed if desired. For example, anti-alias filtering could be performed by adaptively super-sampling the output image on a higher resolution along the horizontal direction.

In another embodiment, the high-quality filter to the input image domain may be moved to the input domain. Such an approach may take advantage of the fact that, for stereo applications, the warp may approximate a global translation, i.e., the warp may only have small local variations. As such, oversampling may be performed in the input domain, by applying a high quality pre-filter $h_{pre}$ to upsample the input image. Deviations from a global translation in the warp may now cause aliasing artifacts that exhibit a directionality change, because the transformed image is sampled on the non-orthogonal grid $\Lambda_{view}$. Accordingly, aliasing due to the warp may be more visible than with post-filtering. Such an effect may be mitigated using adaptive super-sampling or by using adaptive splatting.

Figure 9:
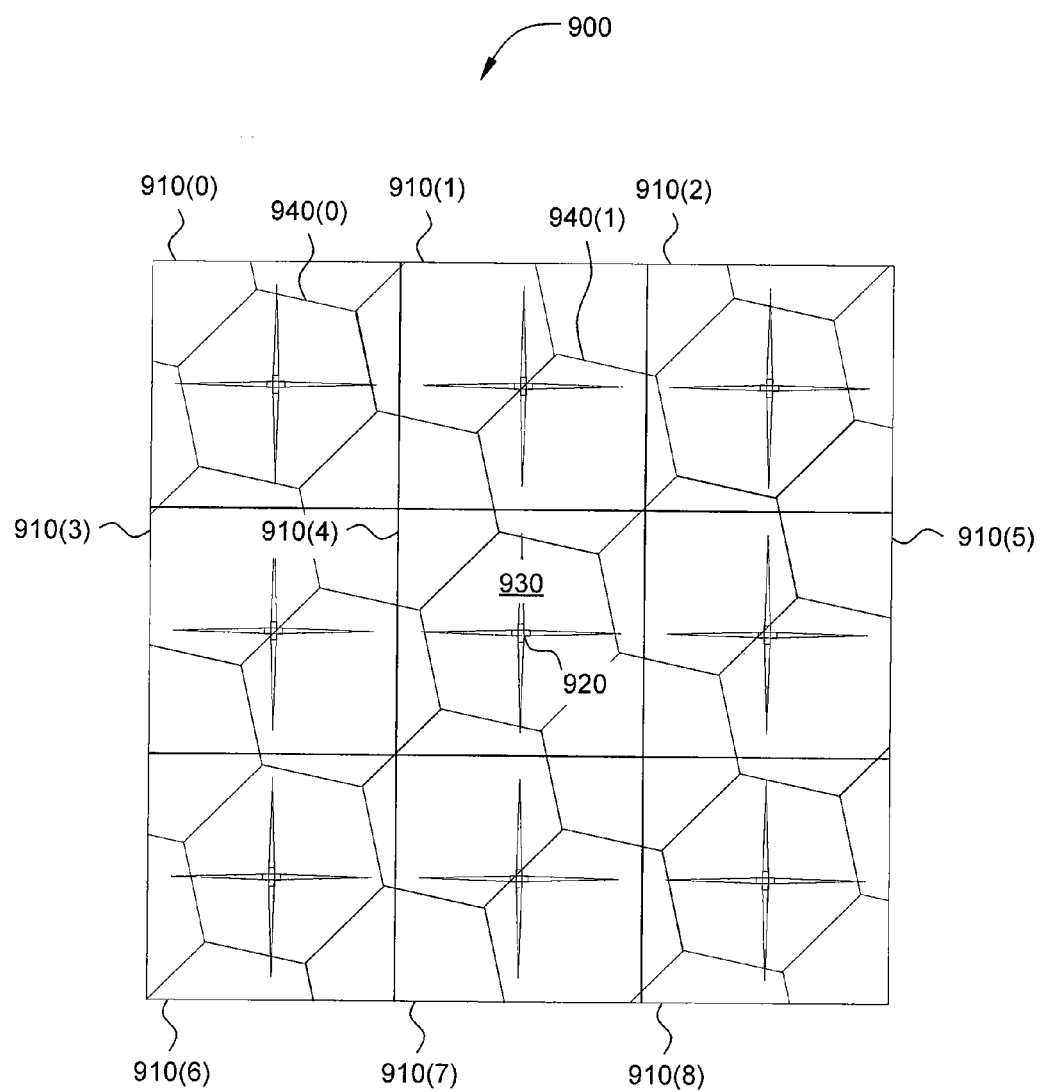
FIG. 9 illustrates the Fourier domain of a 1.5× oversampled input image, overlaid with the primitive cell of the inverse output sampling lattice, according to one embodiment.

FIG. 9 illustrates the Fourier domain 900 of a 1.5× oversampled input image, overlaid with the primitive cell 930 of the inverse output sampling lattice, according to one embodiment. As shown, the Fourier domain includes a centered spectrum 920 of the input image, as well as periodic copies 910 of the centered spectrum 920. The Fourier domain 900 also includes the primitive cell 930 of the inverse sampling lattice, and additional periodic copies 940 of the primitive cell 930. The of the centered spectrum 920, corresponding periodic copies 910 of the centered spectrum 920, primitive cell 930, and periodic copies 940 of the primitive cell 930 function primarily as described in conjunction with FIGS. 7-8, except as further described below.

When using 1.5× oversampling with respect to the input image spectrum 720, the spectrum 920 covers $1.5^2$ times the quantity of hexagonal cells 940 on average. As can be seen, the spectral copies 910 are also placed 1.5× further apart than as shown in FIG. 7. Accordingly, spectral components outside of the primitive cell 930 may be better attenuated even with low order low-pass filters.

Figure 10:
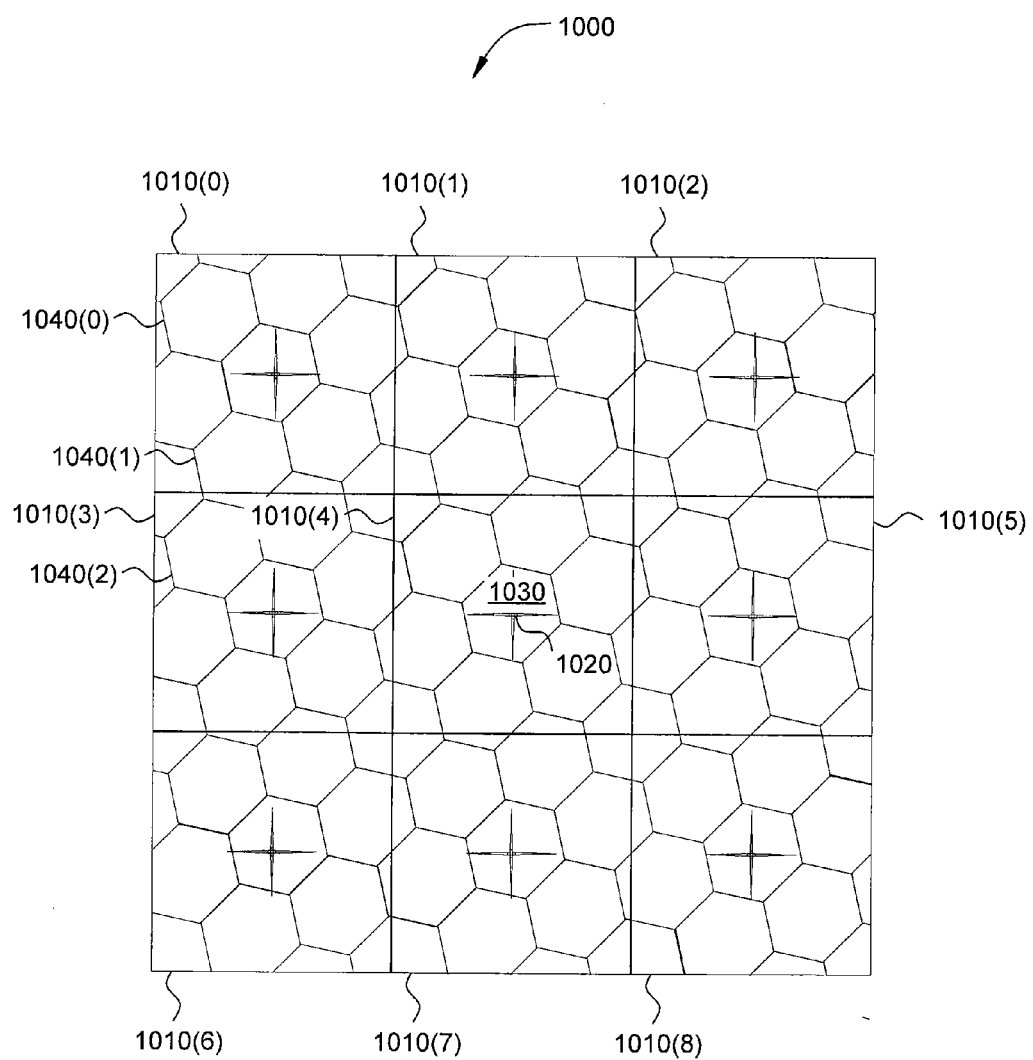
FIG. 10 illustrates the Fourier domain of a 3× oversampled input image, overlaid with the primitive cell of the inverse output sampling lattice, according to one embodiment.

FIG. 10 illustrates the Fourier domain 1000 of a 3× oversampled input image, overlaid with the primitive cell 1030 of the inverse output sampling lattice, according to one embodiment. As shown, the Fourier domain includes a centered spectrum 1020 of the input image, as well as periodic copies 1010 of the centered spectrum 1020. The Fourier domain 1000 also includes the primitive cell 1030 of the inverse sampling lattice, and additional periodic copies 1040 of the primitive cell 1030. The of the centered spectrum 1020, corresponding periodic copies 1010 of the centered spectrum 1020, primitive cell 1030, and periodic copies 1040 of the primitive cell 1030 function primarily as described in conjunction with FIGS. 7-9, except as further described below.

When using 3× oversampling with respect to the input image spectrum 720, the spectrum 1020 covers $3^2$ times the quantity of hexagonal cells 1040 on average. As can be seen, the spectral copies 1010 are also placed 3× further apart than as shown in FIG. 7. Accordingly, spectral components outside of the primitive cell 1030 may be better attenuated even with low order low-pass filters.

Figure 11A:
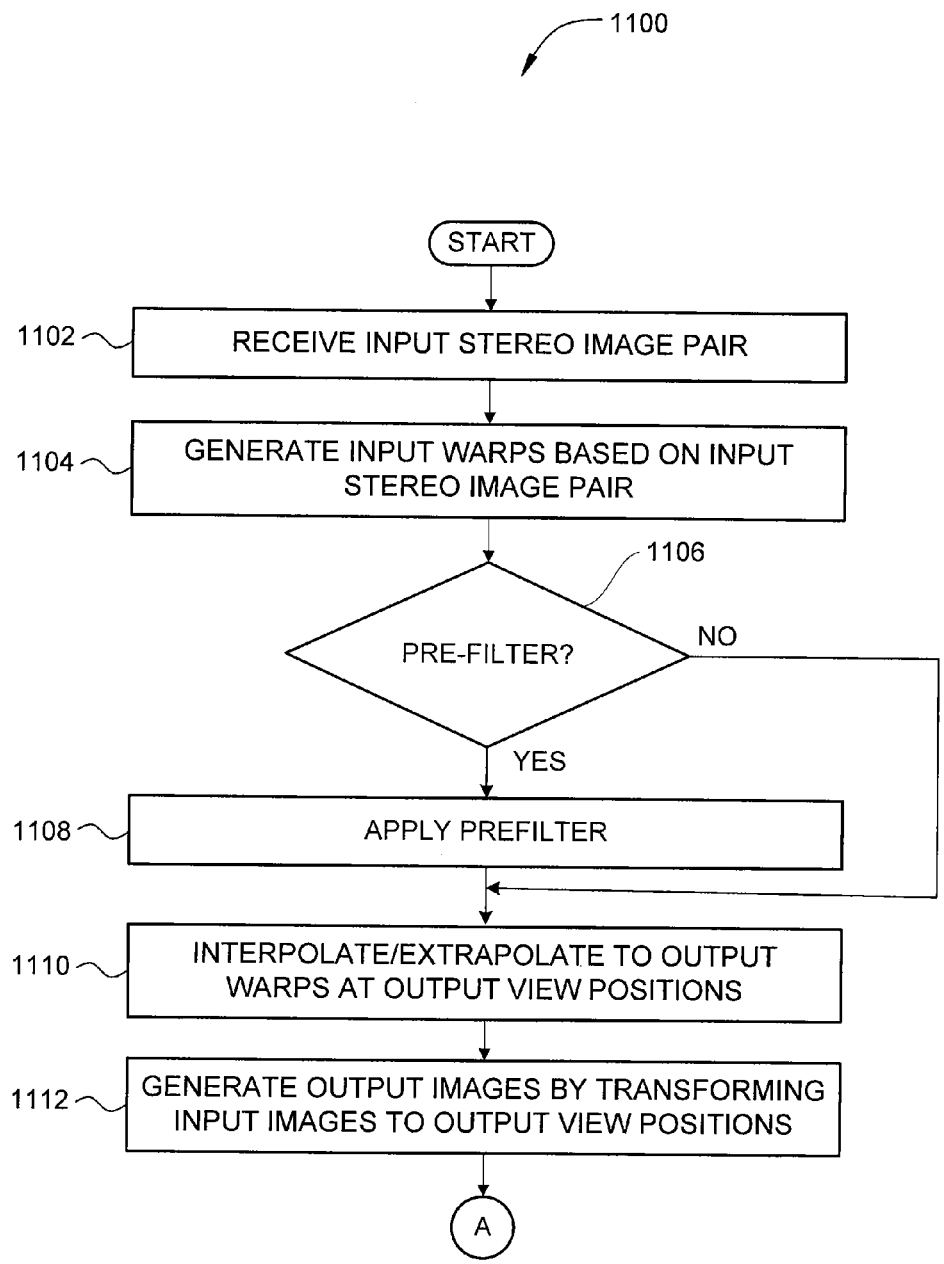
FIGS. 11A-11B set forth a flow diagram of method steps for generating images for a multiview autostereoscopic display from stereo source imagery, according to one embodiment.
Figure 11B:
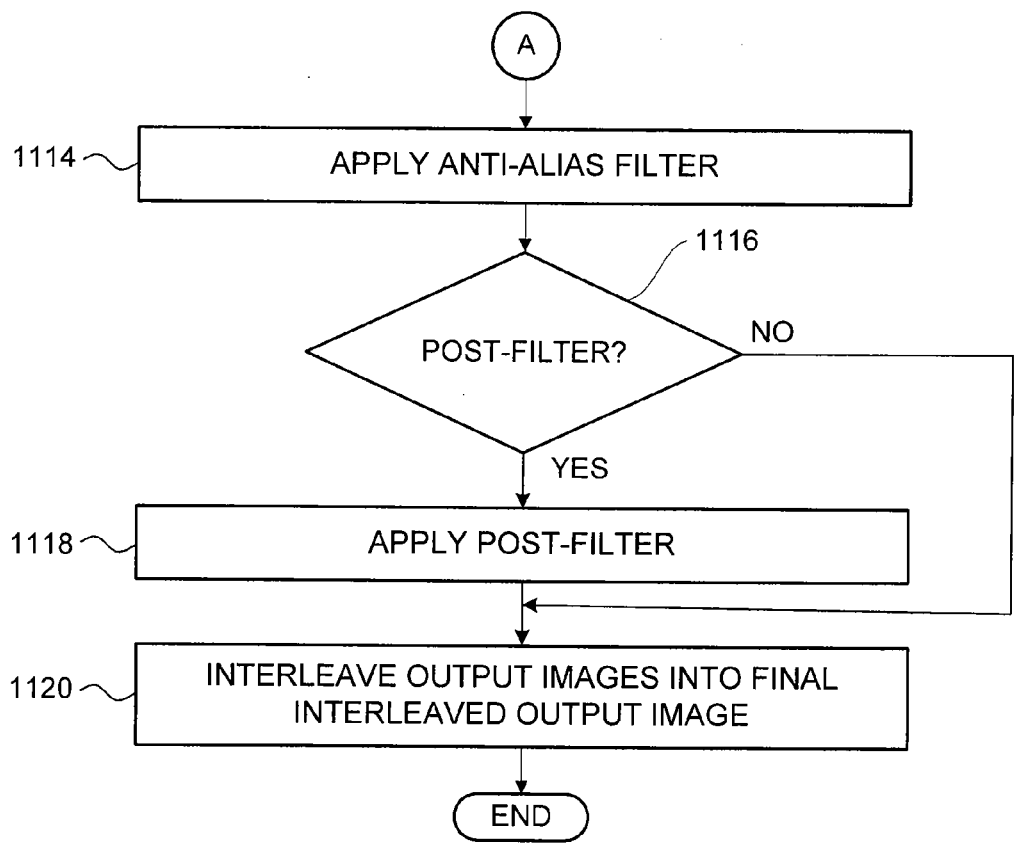

FIGS. 11A-11B set forth a flow diagram of method steps for generating images for a multiview autostereoscopic display from stereo source imagery, according to one embodiment. Although the method steps are described in conjunction with the systems of FIGS. 1-5, persons of ordinary skill in the art will understand that any system configured to perform the method steps, in any order, is within the scope of the application.

As shown, a method 1100 begins at step 1102, where the stereo to multiview rendering system 200 receives an input stereo image pair that includes a left image and a right image. At step 1104, the stereo to multiview rendering system 200 generates input warps based on the left image and the right image of the input stereo image pair. At step 1106, the stereo to multiview rendering system 200 determines whether a pre-filter is applicable to the current rendering application. If a pre-filter is applicable to the current rendering application, then the method 1100 proceeds to step 1108, where the stereo to multiview rendering system 200 applies the pre-filter.

At step 1110, the stereo to multiview rendering system 200 interpolates and extrapolates the input warps to generate output warps at various view positions. At step 1112, the stereo to multiview rendering system 200 generates output images by transforming, or "warping," the input images to the output view positions based on the output warps. At step 1114, the stereo to multiview rendering system 200 applies an anti-alias filter to the output images. At step 1116, the stereo to multiview rendering system 200 determines whether a post-filter is applicable to the current rendering application. If a post-filter is applicable to the current rendering application, then the method 1100 proceeds to step 1118, where the stereo to multiview rendering system 200 applies the post-filter to the output image. At step 1118, the stereo to multiview rendering system 200 interleaves the output images to generated a final interleaved output image. The method 1100 then terminates.

Returning to step 1106, if a pre-filter is not applicable to the current rendering application, then the method 1100 proceeds to step 1110, described above.

Returning to step 1116, if a post-filter is not applicable to the current rendering application, then the method 1100 proceeds to step 1120, described above.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the system shown herein is illustrative and that variations and modifications are possible. For example, the resampling strategies described herein are presented in the context of an image domain warping (IDW) context. However, these approaches could be implemented using any technically feasible framework, including, without limitation depth-image based rendering (DIBR). In another example, any technically feasible resampling filter may be used, in any combination, in conjunction with the disclosed techniques, including, without limitation, a bilinear filter, a bicubic filter, and a 6×6 polyphase Lanczos filter. In yet another example, the resampling strategies described herein are presented in the context of a hexagonal output sampling grid. However, these approaches could be implemented using any technically feasible orthogonal or non-orthogonal output resampling grid.

In sum, multiview autostereoscopic imagery is efficiently generated from stereo 3D input footage using an image domain warping approach. The left and right images from stereo 3D footage is analyzed to reveal sparse image features, such as point correspondences, vertical lines and saliency information. These features are then used to calculate two warps—one for each input image. These warps describe the nonlinear transformation of the input images to a viewing position centered between the two original views. New autostereoscopic views are generated by first interpolating and extrapolating the two warps to the desired view positions, and then resampling the stereo 3D input images according to the interpolated warps. Finally, the generated autostereoscopic views are interleaved in such a way that they can be displayed on a multiview autostereoscopic display.

In one embodiment, the warp interpolation, image resampling, and interleaving steps described herein may be implemented on an application specific integrated circuit (ASIC). Such an ASIC may be part of a larger system that includes online image analysis and warp generation. Alternatively, the ASIC may configured within a stand-alone configuration, where preprocessing is performed by an encoder and the resulting warps are transmitted together with the stereo 3D content (S3D+warp).

While the foregoing is directed to embodiments of the present application, other and further embodiments of the application may be devised without departing from the basic scope thereof, and the scope thereof is determined by the claims that follow.

What is claimed is:

1. A method for generating a multiview autostereoscopic image, comprising:
   receiving a stereo three-dimensional image comprising a left image at a first view position and a right image at a second view position;
   generating a first input warp that maps the left image to a third view position that lies between the first view position and the second view position;
   generating a second input warp that maps the right image to a fourth view position that lies between the first view position and the second view position;
   generating a plurality of output warps based on the first input warp and the second input warp;
   resampling each output warp in the plurality of output warps to create a plurality of partial output images; and
   interleaving the plurality of partial output images to generate a composite output image.

2. The method of claim 1, wherein the third view position is equal to the fourth view position.

3. The method of claim 1, wherein at least one output warp in the plurality of output warps lies between the first view position and the second view position.

4. The method of claim 1, wherein at least one output warp in the plurality of output warps lies outside of a region between the first view position and the second view position.

5. The method of claim 1, wherein at least one output warp is generated by linear interpolation of the first input warp and the second input warp.

6. The method of claim 1, wherein at least one output warp is generated by linear extrapolation of the first input warp and the second input warp.

7. The method of claim 1, wherein resampling comprises:
   transforming pixels of the left image and the right image according to an output warp via a low order interpolation kernel to generate pixels in each corresponding partial output image; and
   applying a high quality post-filter to each corresponding partial output image.

8. The method of claim 7, further comprising performing a locally adaptive super-sampling of each partial output image at a resolution that is higher than a resolution of the respective partial output image.

9. The method of claim 1, wherein resampling comprises:
   applying a high quality pre-filter to the left image to generate a corresponding oversampled left image;
   applying a high quality pre-filter to the right image to generate a corresponding oversampled right image; and
   transforming pixels of the oversampled left image and the oversampled right image according to an output warp via a low order interpolation kernel in conjunction with locally adaptive supersampling in order to generate pixels in each corresponding partial output image in the plurality of output images.

10. The method of claim 1, wherein resampling comprises:
    applying a high quality pre-filter to the left image to generate a corresponding oversampled left image;
    applying a high quality pre-filter to the right image to generate a corresponding oversampled right image; and
    transforming pixels of the oversampled left image and the oversampled right image according to an output warp via locally adaptive splatting in order to generate pixels in each corresponding partial output image in the plurality of output images.

11. The method of claim 1, further comprising storing an animation file on a computer-readable medium, wherein the animation file comprises the output of the receiving, generating, resampling and interleaving steps.

12. A non-transitory computer-readable medium including instructions that, when executed by a processor, cause the processor to generate a multiview autostereoscopic image, by performing an operation comprising:
    receiving a stereo three-dimensional image comprising a left image at a first view position and a right image at a second view position;
    generating a first input warp that maps the left image to a third view position that lies between the first view position and the second view position;
    generating a second input warp that maps the right image to a fourth view position that lies between the first view position and the second view position;
    generating a plurality of output warps based on the first input warp and the second input warp;
    resampling each output warp in the plurality of output warps to create a plurality of partial output images; and
    interleaving the plurality of partial output images to generate a composite output image.

13. The non-transitory computer-readable medium of claim 12, wherein the third view position is equal to the fourth view position.

14. The non-transitory computer-readable medium of claim 12, wherein at least one output warp is generated by linear interpolation of the first input warp and the second input warp.

15. The non-transitory computer-readable medium of claim 12, wherein at least one output warp is generated by linear extrapolation of the first input warp and the second input warp.

16. The non-transitory computer-readable medium of claim 12, wherein resampling comprises:
    transforming pixels of the left image and the right image according to an output warp via a low order interpolation kernel to generate pixels in each corresponding partial output image; and
    applying a high quality post-filter to each corresponding partial output image.

17. The non-transitory computer-readable medium of claim 16, the operation further comprising performing a locally adaptive super-sampling of each partial output image at a resolution that is higher than a resolution of the respective partial output image.

18. The non-transitory computer-readable medium of claim 12, wherein resampling comprises:
    applying a high quality pre-filter to the left image to generate a corresponding oversampled left image;
    applying a high quality pre-filter to the right image to generate a corresponding oversampled right image; and
    transforming pixels of the oversampled left image and the oversampled right image according to an output warp via a low order interpolation kernel in conjunction with locally adaptive supersampling in order to generate pixels in each corresponding partial output image in the plurality of output images.

19. The non-transitory computer-readable medium of claim 12, wherein resampling comprises:
    applying a high quality pre-filter to the left image to generate a corresponding oversampled left image;

applying a high quality pre-filter to the right image to generate a corresponding oversampled right image; and transforming pixels of the oversampled left image and the oversampled right image according to an output warp via locally adaptive splatting in order to generate pixels in each corresponding partial output image in the plurality of output images.

20. A computing system, comprising:

a memory that is configured to store instructions for a program; and a processor that is configured to generate a multiview autostereoscopic image, by performing an operation comprising:

receiving a stereo three-dimensional image comprising a left image at a first view position and a right image at a second view position;

generating a first input warp that maps the left image to a third view position that lies between the first view position and the second view position;

generating a second input warp that maps the right image to a fourth view position that lies between the first view position and the second view position;

generating a plurality of output warps based on the first input warp and the second input warp;

resampling each output warp in the plurality of output warps to create a plurality of partial output images; and interleaving the plurality of partial output images to generate a composite output image.

* * * * *

UNITED STATES PATENT AND TRADEMARK OFFICE
CERTIFICATE OF CORRECTION

PATENT NO. : 9,565,414 B2  
APPLICATION NO. : 14/133518  
DATED : February 7, 2017  
INVENTOR(S) : Aljosa Aleksej Andrej Smolic et al.

Page 1 of 1

It is certified that error appears in the above-identified patent and that said Letters Patent is hereby corrected as shown below:

In the Specification

In Column 16, Line 19, after "filter" insert -- $h_{i\_aa}$; --.

In Column 16, Line 62, delete "The of the" and insert -- The --, therefor.

In Column 17, Line 17, delete "The of the" and insert -- The --, therefor.

Signed and Sealed this  
Sixth Day of June, 2017

Michelle K. Lee  
*Director of the United States Patent and Trademark Office*